(12) United States Patent
Duggal et al.

(10) Patent No.: US 11,416,254 B2
(45) Date of Patent: Aug. 16, 2022

(54) ZERO CYCLE LOAD BYPASS IN A DECODE GROUP

(71) Applicant: Apple Inc., Cupertino, CA (US)

(72) Inventors: Deepankar Duggal, Sunnyvale, CA (US); Kulin N. Kothari, Cupertino, CA (US); Conrado Blasco, Sunnyvale, CA (US); Muawya M. Al-Otoom, Lake Oswego, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/705,023

(22) Filed: Dec. 5, 2019

(65) Prior Publication Data

US 2021/0173654 A1   Jun. 10, 2021

(51) Int. Cl.
*G06F 9/30* (2018.01)
*G06F 9/38* (2018.01)

(52) U.S. Cl.
CPC ........ *G06F 9/3826* (2013.01); *G06F 9/30043* (2013.01); *G06F 9/384* (2013.01)

(58) Field of Classification Search
CPC ..... G06F 9/384; G06F 9/30043; G06F 9/3842
See application file for complete search history.

(56) References Cited

U.S. PATENT DOCUMENTS

| | | |
|---|---|---|
| 5,630,149 A | 5/1997 | Bluhm |
| 5,655,096 A | 8/1997 | Branigin |
| 5,751,983 A | 5/1998 | Abramson et al. |
| 5,926,646 A | 7/1999 | Pickett et al. |
| 6,047,369 A | 4/2000 | Colwell et al. |
| 6,065,103 A | 5/2000 | Tran et al. |
| 6,094,716 A | 7/2000 | Witt |
| 6,122,656 A | 9/2000 | Witt |

(Continued)

FOREIGN PATENT DOCUMENTS

| | | |
|---|---|---|
| CN | 1136182 A | 11/1996 |
| EP | 0297265 A2 | 1/1989 |

(Continued)

OTHER PUBLICATIONS

International Search Report and Written Opinion in International Application No. PCT/US2013/043318 dated Dec. 16, 2013, 11 pages.

(Continued)

*Primary Examiner* — Jacob Petranek
(74) *Attorney, Agent, or Firm* — Kowert Hood Munyon Rankin and Goetzel PC; Rory D. Rankin

(57) ABSTRACT

Systems, apparatuses, and methods for implementing zero cycle load bypass operations are described. A system includes a processor with at least a decode unit, control logic, mapper, and free list. When a load operation is detected, the control logic determines if the load operation qualifies to be converted to a zero cycle load bypass operation. Conditions for qualifying include the load operation being in the same decode group as an older store operation to the same address. Qualifying load operations are converted to zero cycle load bypass operations. A lookup of the free list is prevented for a zero cycle load bypass operation and a destination operand of the load is renamed with a same physical register identifier used for a source operand of the store. Also, the data of the store is bypassed to the load.

20 Claims, 8 Drawing Sheets

(56) References Cited

U.S. PATENT DOCUMENTS

| | | | |
|---|---|---|---|
| 6,122,725 | A | 9/2000 | Roussel et al. |
| 6,256,721 | B1 | 7/2001 | Witt |
| 6,505,293 | B1* | 1/2003 | Jourdan .............. G06F 9/30181 |
| | | | 712/217 |
| 6,560,671 | B1 | 5/2003 | Samra et al. |
| 6,594,754 | B1 | 7/2003 | Jourdan et al. |
| 6,662,280 | B1 | 12/2003 | Hughes |
| 6,701,425 | B1 | 3/2004 | Dabbagh et al. |
| 7,263,600 | B2 | 8/2007 | Sander et al. |
| 7,467,239 | B2 | 12/2008 | Nicolai et al. |
| 9,996,348 | B2 | 6/2018 | Williams, III et al. |
| 2004/0044881 | A1* | 3/2004 | Maier ................... G06F 9/3834 |
| | | | 712/218 |
| 2004/0255101 | A1 | 12/2004 | Filippo et al. |
| 2005/0066131 | A1 | 3/2005 | Biles et al. |
| 2005/0091475 | A1 | 4/2005 | Sodani |
| 2005/0138338 | A1 | 6/2005 | Sodani et al. |
| 2005/0138339 | A1* | 6/2005 | Hily ...................... G06F 9/3834 |
| | | | 712/225 |
| 2008/0059770 | A1 | 3/2008 | Garg et al. |
| 2008/0215804 | A1 | 9/2008 | Davis et al. |
| 2010/0153690 | A1 | 6/2010 | Vick et al. |
| 2010/0299499 | A1 | 11/2010 | Golla et al. |
| 2011/0040955 | A1 | 2/2011 | Hooker et al. |
| 2011/0320785 | A1 | 12/2011 | Chen et al. |
| 2012/0005459 | A1 | 1/2012 | Fleischman et al. |
| 2013/0275720 | A1 | 10/2013 | Keller et al. |
| 2013/0297912 | A1 | 11/2013 | Tran et al. |
| 2013/0339671 | A1* | 12/2013 | Williams, III ........ G06F 9/3834 |
| | | | 712/217 |
| 2016/0026463 | A1 | 1/2016 | Sundar |
| 2018/0081806 | A1* | 3/2018 | Kothinti Naresh ... G06F 9/3842 |
| 2019/0310845 | A1* | 10/2019 | Ramani ................. G06F 9/3838 |

FOREIGN PATENT DOCUMENTS

| | | | |
|---|---|---|---|
| JP | 2000148488 | A | 5/2000 |
| JP | 2000181715 | A | 6/2000 |
| JP | 2005532613 | A | 10/2005 |
| JP | 2007503661 | A | 2/2007 |
| JP | 2007536626 | A | 12/2007 |
| KR | 1020070019750 | A | 2/2007 |
| TW | 201003517 | A | 1/2010 |
| WO | 2003093982 | A1 | 11/2003 |
| WO | 2005111794 | A1 | 11/2005 |
| WO | 2009129052 | A1 | 10/2009 |

OTHER PUBLICATIONS

Extended European Search Report in European Application No. 13170357.1, dated Jun. 24, 2014, 6 pages.
Akkary, Haitham, et al. "An Analysis of a Resource Efficient Checkpoint Architecture", ACM Transactions on Architecture and Code Optimization, Dec. 2004, pp. 418-444, vol. 1, No. 4, New York, USA.
Notice of Preliminary Rejection in Korean Patent Application No. 10-2013-68008, dated Aug. 18, 2014, 11 pages.
Office Action in Japanese Patent Application No. 2013-125333, dated Oct. 20, 2014, 8 pages.
Office Action in Taiwan Patent Application No. 102120951, dated Mar. 17, 2015, 11 pages.
Final Office Action in Japanese Patent Application No. 2013-125333, dated Jun. 29, 2015, 5 pages.
Notification of the First Office Action in Chinese Application No. 201310236291.X, dated Jan. 25, 2016, 19 pages.
Notification of the Second Office Action in Chinese Application No. 201310236291.X, dated Sep. 7, 2016, 18 pages.
Kanter, David, "Intels Sandy Bridge Microarchitecture", Real World Technologies, Sep. 25, 2010, http://www.realworldtech.com/sandy-bridge/, 25 pages. [Retrieved May 14, 2015].
Jourdan, et al., "A Novel Renaming Scheme to Exploit Value Temporal Locality through Physical Register Reuse and Unification" Proceedings of the 31st Annual ACM/IEEE International Symposium on Microarchitecture, Nov. 1, 1998, 10 pages, IEEE Computer Society Press, Los Alamitos, CA, USA.

* cited by examiner

ZERO CYCLE LOAD BYPASS IN A DECODE GROUP

BACKGROUND

Technical Field

Embodiments described herein relate to the field of integrated circuits and, more particularly, to efficiently bypassing data to a load operation in a processor pipeline.

Description of the Related Art

Modern microprocessors are designed to take advantage of instruction level parallelism (ILP) in source code. One technique for increasing ILP during execution involves register renaming. Register renaming involves mapping architectural registers which are specified in instructions to physical registers of the processor, with the physical registers accessed during execution of the instructions. Without register renaming, instructions that write to the same architectural register would have to be executed in order. However, with register renaming, the same architectural register can be mapped to different physical registers, allowing the instructions to be executed in a different order. In register renaming, there is an optimization called a zero-cycle load which is described in U.S. Pat. No. 9,996,348. As described therein, the latency of executing certain types of load instructions may be reduced by assigning a physical register associated with a source operand of a store instruction to the destination operand of the load instruction. However, in certain scenarios, some load instructions are unable to take advantage of this zero-cycle load optimization.

SUMMARY

Systems, apparatuses, and methods for implementing zero cycle load bypass operations are contemplated. In various embodiments, a computing system includes a processor with at least a decode unit, control logic, mapper, and free list. When a load operation is detected, the control logic determines if the load operation qualifies to be converted to a zero cycle load bypass operation. A condition for qualifying includes being in the same decode group as an older store operation which targets a same address as the load operation. Other conditions for qualifying may also be required in other embodiments. Qualifying load operations are converted to zero cycle load bypass operations. A lookup of the free list is prevented for a zero cycle load bypass operation and a destination operand of the load operation is renamed with a same physical register identifier as a source operand of the store operation. Also, the data of the store operation is bypassed to the load operation from the physical register file.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
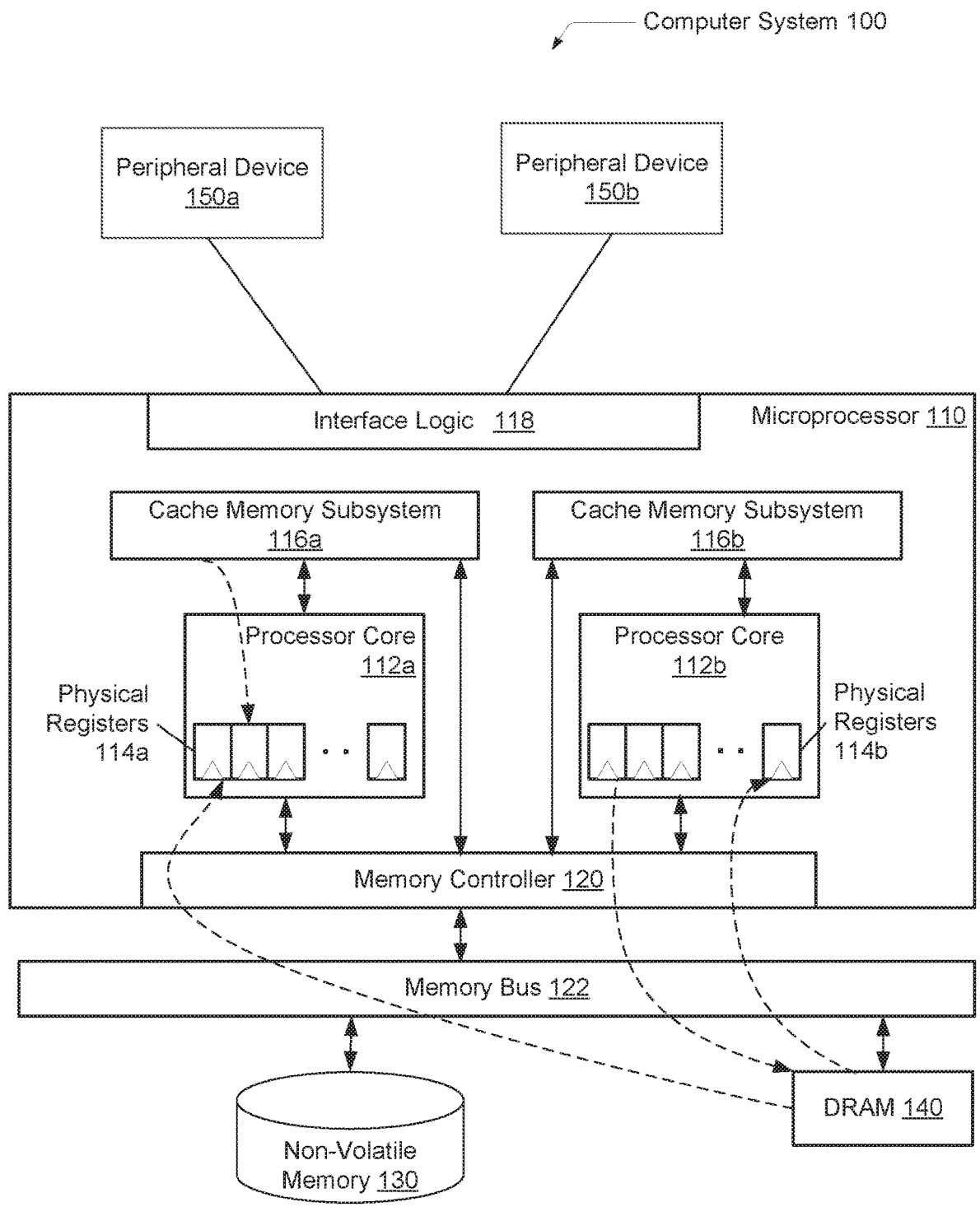
FIG. 1 is a generalized block diagram of one embodiment of a computer system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a computer system 100 is shown. As shown, microprocessor 110 may be connected to one or more peripheral devices 150*a*-150*b*, and external computer memory, such as non-volatile memory 130 and dynamic random access memory (DRAM) 140. The non-volatile memory 130 may store an operating system (OS) for the computer system 100. Instructions of a software application may be loaded into one or more of the cache memory subsystems 116*a*-116*b* within the microprocessor 110. The software application may have been stored in one or more of the non-volatile memory 130, the DRAM 140 and one of the peripheral devices 150a-150b. The non-volatile memory 130 may provide a non-volatile, random access secondary storage of data. In one embodiment, the off-chip non-volatile memory 130 may include one or more hard disk drives (HDDs). In another embodiment, the off-chip non-volatile memory 130 utilizes a Solid-State Disk (SSD). The off-chip DRAM 140 may be a type of dynamic random-access memory that stores each bit of data in a separate capacitor within an integrated circuit. Unlike HDDs and flash memory, the DRAM 140 may be volatile memory, rather than non-volatile memory.

One or more of the processor cores 112a-112b may load the software application instructions from one of an associated cache memory subsystems 116a-116b and process the instructions. Generally speaking, when software programmers write applications to perform work according to an algorithm or a method, the programmers utilize variables to reference temporary and result data. This data utilizes space allocated in computer memory. The operating system allocates regions of memory for the software application. During processing of the application, the data may be loaded from the allocated regions of memory into one or more of the cache memory subsystems 116a-116b. Subsequently, one or more of the physical registers 114a-114b within the processor cores 112a-112b are used to load and store the temporary and result data. A store instruction is typically used to transfer data between the microprocessor 110 and memory. A load instruction is used to transfer data between memory and the microprocessor 110. The dashed lines shown in the computer system 100 indicate a few examples of the data transfers performed by store and load operations.

In one implementation, the physical registers 114a-114b are assigned to architecturally visible registers that a software programmer and/or a compiler may identify within the software application. The architectural registers are associated with a given instruction set architecture (ISA). The hardware in the processor cores 112a-112b includes circuitry for processing instructions according to the given ISA. The hardware circuitry includes at least an associated set of physical registers 114a-114b, functional units, pipeline staging elements, and control logic.

In addition to including processor cores 112a-112b connected to corresponding cache memory subsystems 116a-116b, the microprocessor 110 may also include interface logic 118, and a memory controller 120. Other logic and inter- and intra-block communication is not shown for ease of illustration. The illustrated functionality of the microprocessor 110 may be incorporated upon a single integrated circuit. In another embodiment, the illustrated functionality is incorporated in a chipset on a computer motherboard. In some embodiments, the microprocessor 110 may be included in a desktop or a server. In yet another embodiment, the illustrated functionality is incorporated in a semiconductor die on a system-on-a-chip (SOC).

Each of the processor cores 112a-112b may include circuitry for executing instructions according to a given ISA as described earlier. In one embodiment, each of the processor cores 112a-112b may include a superscalar, multi-threaded microarchitecture used for processing instructions of a given ISA. Although multiple general-purpose processor cores are shown in the microprocessor 110, in various other embodiments, the microprocessor 110 may include one or more other specific cores, such as a digital signal processor (DSP), a graphics processing unit (GPU), an application specific integrated circuit (ASIC), and so forth.

Although only two peripheral devices are shown in the computer system 100 for illustrative purposes, another number of peripheral devices may be connected to the microprocessor 110. One or more of the peripheral devices 150a-150b may be a display such as a touchscreen, a modern TV, a computer monitor, or other type of display. The computer monitor may include a thin film transistor liquid crystal display (TFT-LCD) panel. Additionally, the display may include a monitor for a laptop and other mobile devices. A video graphics subsystem may be used between the display and the microprocessor 110. The video graphics subsystem may be a separate card on a motherboard and include a graphics processing unit (GPU). One or more of the peripheral devices 150a-150b may be one of a typically utilized input/output device such as a keyboard, mouse, printer, modem, and so forth.

In addition to out-of-order issue of instructions to execution units within a superscalar microarchitecture, each of the processor cores 112a-112b may perform register renaming to increase throughput. Each of the processor cores 112a-112b may include a set of physical registers 114a-114b larger than a set of integer and floating-point architecturally visible registers. For example, in some embodiments, each of the processor cores 112a-112b includes 32 architecturally visible architectural registers and 192 physical registers 114a-114b.

Using hardware, each of the processor cores 112a-112b dynamically renames an architectural register identifier used for a source operand. Similarly, the hardware dynamically renames an architectural register identifier used for a destination operand. The renaming may occur after instruction decode. When an architectural register identifier is renamed, a new physical register identifier from the free list is used to replace an old physical register identifier which was previously mapped to the architectural register identifier. When an instruction commits (i.e., retires), the old physical register identifier becomes a candidate to return to the free list.

When the hardware renames an architectural register identifier with a physical register identifier, the hardware stores the mapping in a data structure, such as a mapping table. As used herein, an identifier for either an architectural register or a physical register may also be referred to as a number. Therefore, an architectural register identifier may also be referred to as an architectural register number. Similarly, a physical register identifier may be referred to as a physical register number. The physical register number used to rename an architectural register number may also be referred to as a rename register number.

Each of the processor cores 112a-112b may include a free list data structure for storing physical register numbers for physical registers that are not currently assigned to any architectural registers. In other words, the physical register numbers stored in the free list correspond to physical registers which are available to be assigned to architectural registers. In various embodiments, the free list has a number of entries equal to the number of physical registers. For example, each of the processor cores 112a-112b may include 192 physical registers. Therefore, the free list in this embodiment would have 192 entries. In some embodiments, the free list may be implemented with flip-flop registers, wherein each entry corresponds to a respective rename register number.

Figure 2:
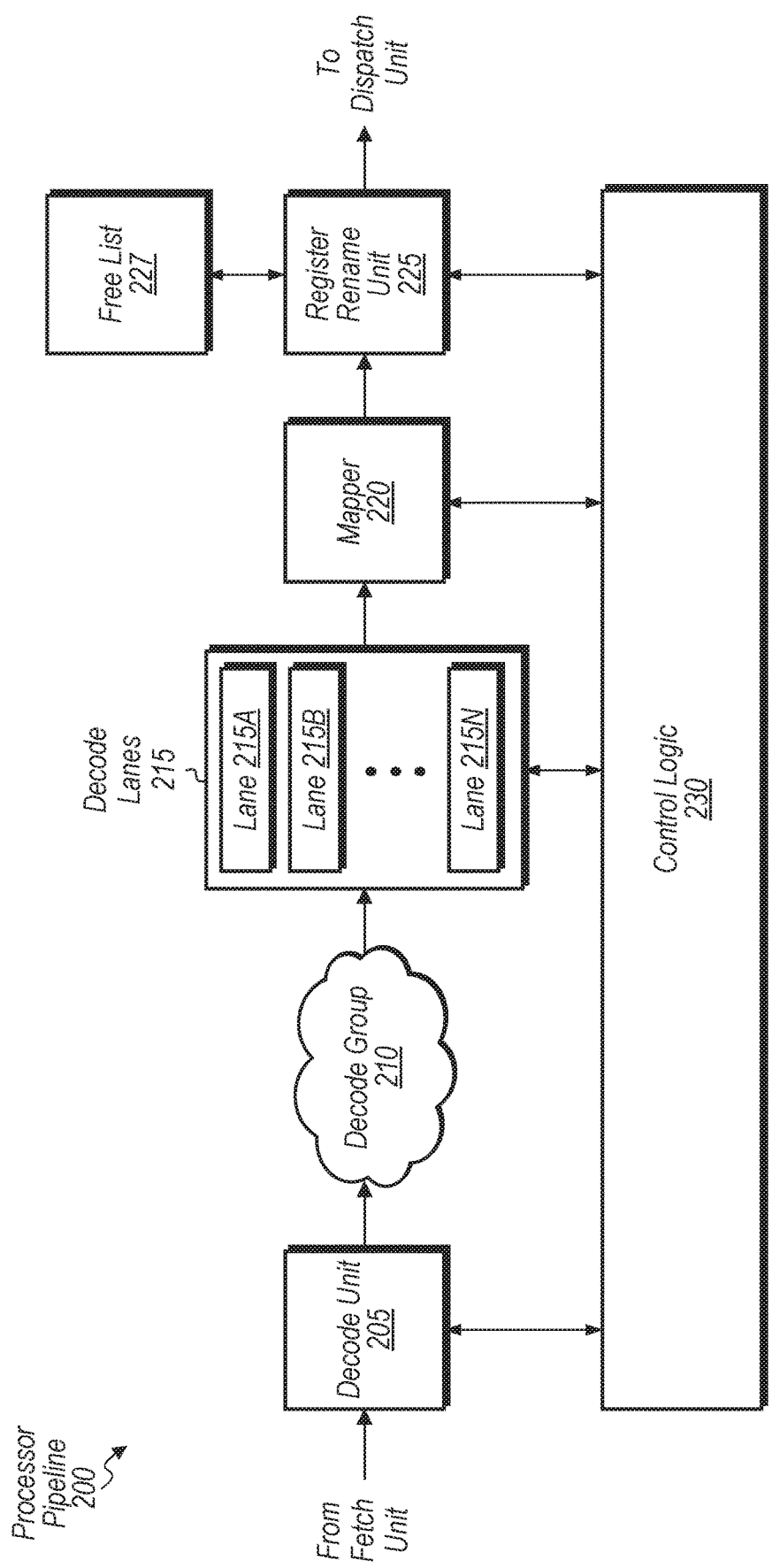
FIG. 2 is a generalized block diagram illustrating one embodiment of a portion of a processor pipeline.

Turning now to FIG. 2, a block diagram of one embodiment of a portion of a processor pipeline 200 is shown. As shown in FIG. 2, processor pipeline 200 includes decode unit 205, decode lanes 215, mapper 220, register rename unit 225, free list 227, and control logic 230. It is noted that processor pipeline 200 may also include other components which are not shown to avoid obscuring the figure. Decode unit 205 receives instructions from a fetch unit (not shown) and decodes the fetched instructions into operations executable by the processor. It is noted that the term "operation" may be used interchangeably herein with the terms "instruction operation" or "op". In each clock cycle, decode unit 205 decodes a group of instructions to create a decoded group of operations. One example of a decoded group of operations is shown as decode group 210 in FIG. 2. As used herein, the term "decode group" is defined as the decoded operations that are generated by a decode unit in a single clock cycle. The number of operations in a decode group varies according to the processor architecture and may vary from clock cycle to clock cycle.

Decode group 210 is conveyed to decode lanes 215A-N which are representative of any number of decode lanes for passing decoded operations from decode unit 205 to mapper 220. Mapper 220 tracks dependencies between operations and maps operands of these decoded operations to architectural registers. In one embodiment, mapper 220 maintains mappings between architectural register identifiers and physical register identifiers. After mapper 220, the decoded operations are conveyed to register rename unit 225 where architectural register identifiers are renamed with physical register identifiers from free list 227. Free list 227 maintains the physical register identifiers (i.e., physical register numbers) that are available for renaming purposes. From register rename unit 225, operations are conveyed to a dispatch unit (not shown). Although not shown in FIG. 2, processor pipeline 200 may also include a structure for tracking duplicate mappings in mapper 220, with the structure used in determining when physical register identifiers can be returned to free list 227.

Control logic 230 is coupled to the various units of processor pipeline 200, and control logic 230 detects operations and scenarios that can be optimized to increase the efficiency of processor pipeline 200. For example, in one embodiment, control logic 230 determines if decode group 210 includes a store op and a load op which are predicted to have an address dependency. For JavaScript workloads running in interpreted mode, it is common to have unoptimized store-load sequences aligning in the same decode group. Store-load sequences that exist in the same decode group are not captured by conventional zero cycle load optimization techniques.

In one embodiment, control logic 230 performs an opcode compare of every two consecutive ops that are traversing processor pipeline 200. If two consecutive ops are an older store op and a younger load op with a predicted address dependency, then control logic 230 updates the mapping of the load op in mapper 220 to cause the physical register assigned to the destination operand of the load op to be the same as the physical register which is assigned to the source operand of the store op. This prevents the data targeted by the load op from being loaded from memory after the data is written to memory by the store op. This can save multiple cycles of latency by having the data from the store op forwarded to the load op. In some embodiments, control logic 230 also determines if the store op and load op with the predicted address dependency are on adjacent lanes in decode lanes 215A-B. For example, lane 215A and lane 215B are adjacent lanes while lane 215A and lane 215N are not adjacent lanes. The store op and load op being on adjacent decode lanes is an example of a condition that may be applied to qualify for a zero cycle load bypass optimization in some but not all embodiments. In some cases, if the store op and load op are not on adjacent decode lanes but there are no intervening writes to the same architectural register, then the load op can still quality to be converted to a zero cycle load bypass op.

Figure 3:
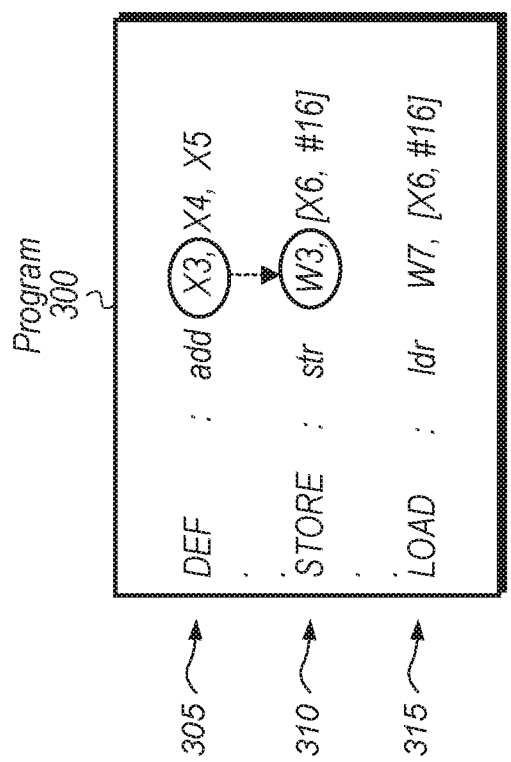
FIG. 3 illustrates an example of a program in accordance with one embodiment.

Referring now to FIG. 3, one example of program 300 in accordance with one embodiment is shown. Program 300 is one example of a software program that is executed on a processor (e.g., processor 112A of FIG. 1). Program 300 includes any number of instructions, with three instructions 305, 310, and 315 shown in FIG. 3. Instructions 305-315 are meant to be a pseudocode example and language agnostic. Program 300 may also include any number of other instructions in addition to those shown.

Instruction 305 is a data producer which is producing data and writing the data into register X3. In the example shown, instruction 305 is an add instruction. However, other types of data producer instructions may be used in other embodiments. This data is then forwarded to store instruction 310, which is writing the data from register W3 into the memory address referenced by X6 with an offset of 16. Load instruction 315 loads this data back from the same memory address location into register W7. These instructions are an example of a zero cycle load. Generally speaking, a zero cycle load involves a data producer forwarding data to a store which is then forwarded to a load. When the store and the load are included in the same decode group, then this represents an opportunity for implementing a zero cycle load bypass optimization.

Figure 4:
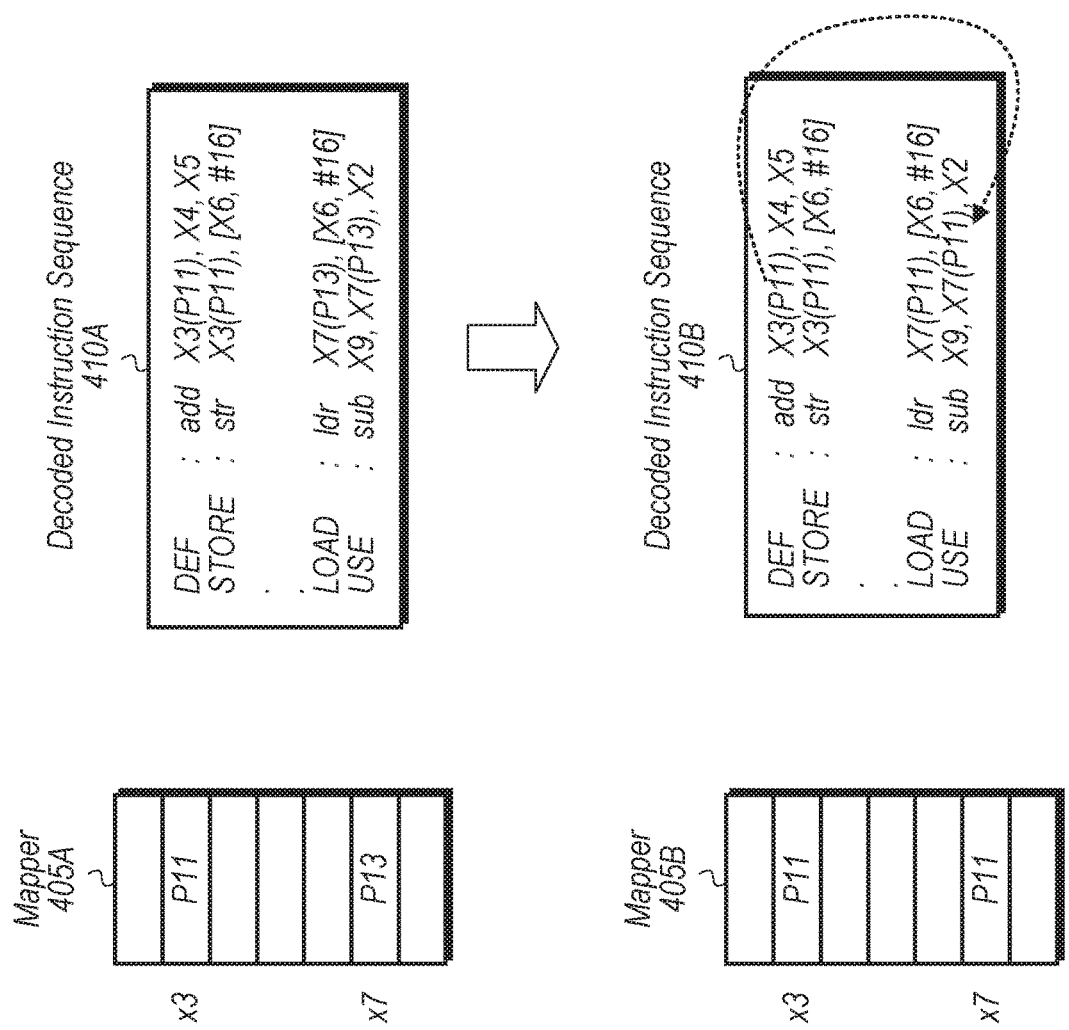
FIG. 4 illustrates an example of a mapper and decoded instruction sequence in accordance with one implementation.

Turning now to FIG. 4, an example of a mapper and decoded instruction sequence in accordance with one embodiment is shown. Mapper 405A and decoded instruction sequence 410A are shown at the top of FIG. 4 to illustrate an example of a mapper and decoded instruction sequence with an inefficient mapping for a load-store dependency pair. Sequences like the one shown in decoded instruction sequence 410A are quite common for JavaScript traces in interpreted mode. For example, in decoded instruction sequence 410A, the store op is storing data to physical register P11 with the data then being written to memory. Next, the load op is loading this data from memory to physical register P13. The corresponding register mappings are shown in mapper 405A with architectural register identifier x3 mapped to physical register identifier P11 and architectural register identifier x7 mapped to physical register identifier P13.

However, in one implementation, rather than executing decoded instruction sequence 410A as it was originally decoded, control logic (e.g., control logic 230 of FIG. 2) renames the architectural register identifier x7 to physical register identifier P11. This is shown in mapper 405B which represents the state of mappings after the control logic has performed the zero cycle load bypass optimization. Also, decoded instruction sequence 410B represents the optimized version of decoded instructions after the optimization has been performed by the control logic. In decoded instruction sequence 410B, the data from the store op is provided directly to the load op from physical register P11 rather than loading the data from memory or cache into physical register P13. The optimization in this case saves four cycles of latency for the bypassing load op. There is potentially another cycle of savings for the bypassing store op if the store-load chain is on the critical path.

Figure 5:
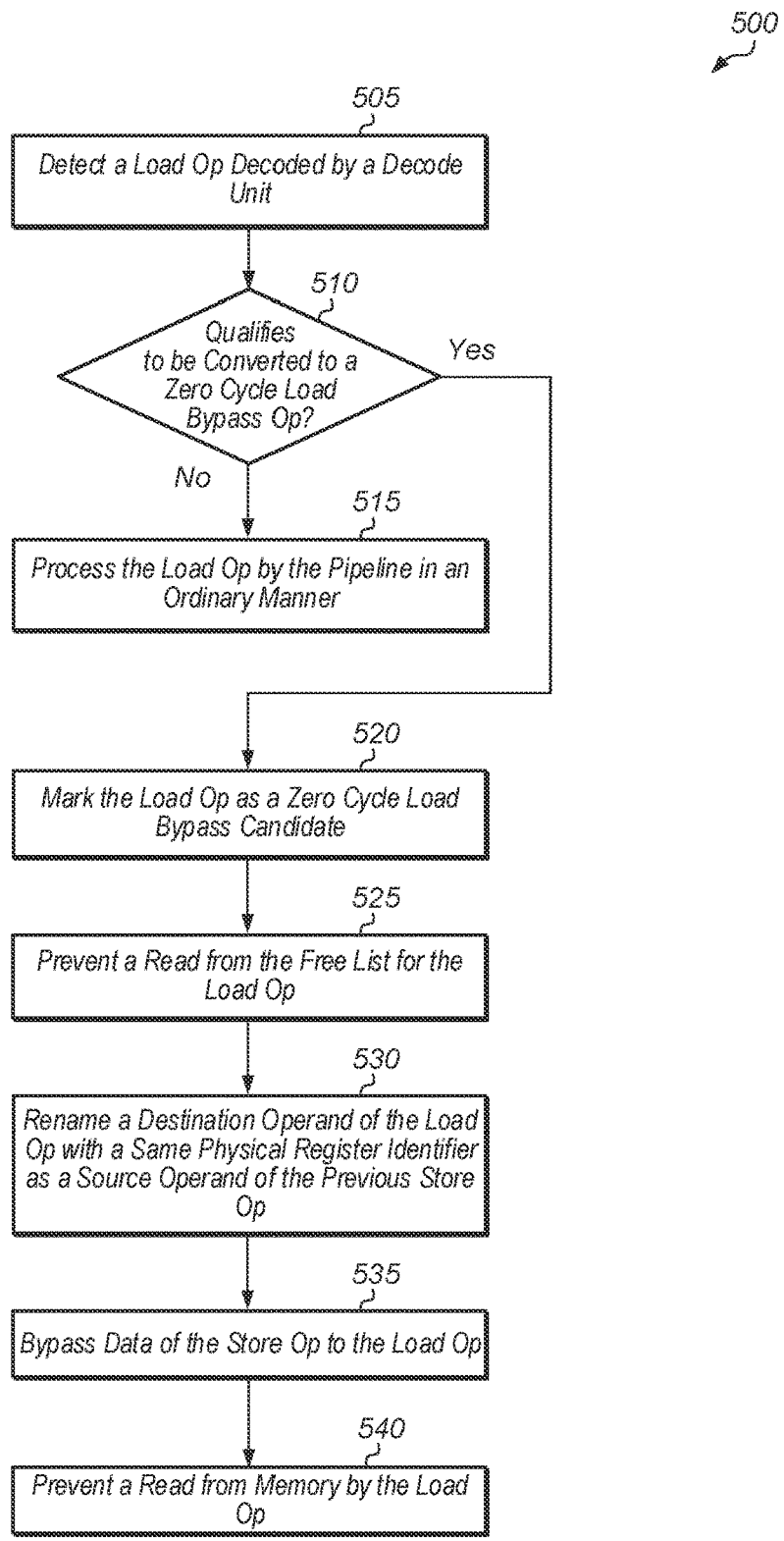
FIG. 5 is a flow diagram of one embodiment of a method for implementing a zero cycle load bypass optimization.

Referring now to FIG. 5, a generalized flow diagram of one embodiment of a method 500 for implementing a zero cycle load bypass optimization is shown. For purposes of discussion, the steps in this embodiment (as well as for FIGS. 6 and 7) are shown in sequential order. However, in other embodiments some steps may occur in a different order than shown, some steps may be performed concurrently, some steps may be combined with other steps, and some steps may be absent.

A processor detects a load op decoded by a decode unit (block 505). Next, the processor determines if the load op qualifies to be converted to a zero cycle load bypass op (conditional block 510). For example, in one implementation, if an older store op is writing to the same address as the load op, then the load op meets a first condition for being converted to a zero cycle load bypass op. Also, if the store op and the load op are in a same decode group, then the load op meets a second condition for being converted to a zero cycle load bypass op. In one embodiment, if the load op meets these two conditions, then the load op qualifies to be converted to a zero cycle load bypass op. In other embodiments, other conditions are used to determine whether the load op qualifies to be converted to a zero cycle load bypass op.

If the load op does not qualify to be converted to a zero cycle load bypass op (conditional block 510, "no" leg), then the load op is processed by the pipeline in an ordinary manner (block 515). If the load op qualifies to be converted to a zero cycle load bypass op (conditional block 510, "yes" leg), then the load op is marked as a zero cycle load bypass candidate (block 520). Next, a read from the free list is prevented for the load op (block 525). Also, the destination operand of the load op is renamed with a same physical register identifier as a source operand of the previous store op (block 530). Typically, a read from the free list is performed to find an available physical register number to assign to the destination operand of the load op. However, when the load op is converted to a zero cycle load bypass op, the load op will be assigned the same physical register number as the source operand of the previous store op. Then, the data of the store op is bypassed to the load op (block 535) and an access of memory responsive to the load op is not performed (block 536). After block 540, method 500 ends. It is assumed for the purposes of this discussion that the store op and the load op have been correctly identified as having an address dependency. In cases where speculation of an address dependency is incorrect, the load op and younger (in program order) ops may be flushed from the pipeline and replayed.

Figure 6:
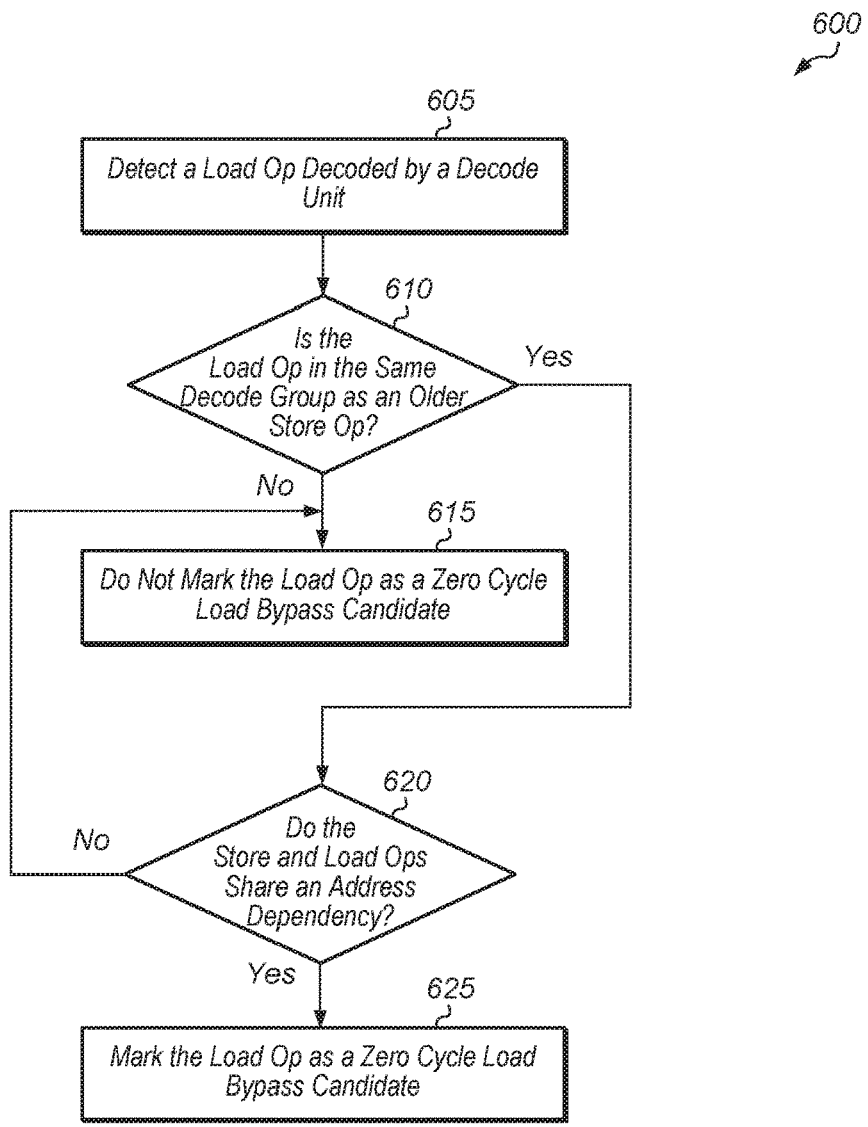
FIG. 6 is a flow diagram of one embodiment of a method for determining whether a load op is a zero cycle load bypass candidate.

Turning now to FIG. 6, one embodiment of a method 600 for determining whether a load op is a zero cycle load bypass candidate is shown. Control logic detects a load op decoded by a decode unit (block 605). In response to detecting the load op, the control logic determines whether the load op is in the same decode group as an older store op (conditional block 610). If the load op is not in the same decode group as an older store op (conditional block 610, "no" leg), then the control logic does not mark the load op as a zero cycle load bypass candidate (block 615).

If the load op is in the same decode group as an older store op (conditional block 610, "yes" leg), then the control logic determines if the store op and the load op share an address dependency (conditional block 620). If the store and load ops do not share an address dependency (conditional block 620, "no" leg), then the control logic does not mark the load op as a zero cycle load bypass candidate (block 615). Otherwise, if the store and load ops share an address dependency (conditional block 620, "yes" leg), then the control logic marks the load op as a zero cycle load bypass candidate (block 625). After blocks 615 and 625, method 600 ends. It is noted that conditional blocks 610 and 620 may be checked in any suitable order or they may be checked in parallel.

It is also noted that in other embodiments, other conditions may be checked in method 600 to determine if the load op should be marked as a zero cycle load bypass candidate. For example, another condition for marking the load op as a zero cycle load bypass candidate is that the store op and the load op are on adjacent decode lanes. Alternatively, if the store op and load op are not on adjacent decode lanes, then as long as there is no intervening write to the same architectural register, then the load op may still be marked as a zero cycle load bypass candidate. In a further embodiment, another condition for marking the load op as a zero cycle load bypass candidate is that a data producer of data stored by the store op is not a zero cycle op (e.g., zero cycle load op, zero cycle move op). Other conditions are possible and are contemplated.

Figure 7:
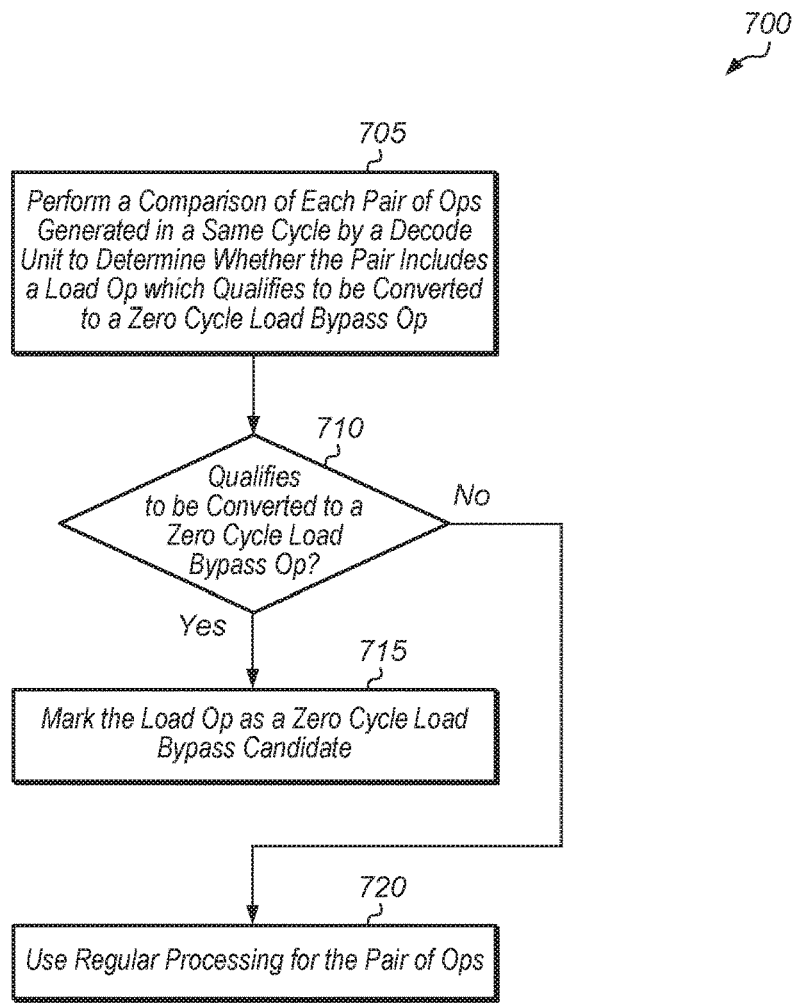
FIG. 7 is a flow diagram of one embodiment of a method for performing a zero cycle load bypass qualification check on consecutive ops generated by a decode unit.

Referring now to FIG. 7, one embodiment of a method 700 for performing a zero cycle load bypass qualification check of consecutive ops generated by a decode unit is shown. Control logic performs a comparison of each pair of ops generated in a same cycle by a decode unit to determine whether the pair includes a load op which qualifies to be converted to a zero cycle load bypass op (block 705). In one embodiment, the comparison is performed between a portion of the opcode bits of the consecutive ops. If the pair includes a load op which qualifies to be converted to a zero cycle load bypass op (conditional block 710, "yes" leg), then the load op is marked as a zero cycle load bypass candidate (block 715). Otherwise, if the comparison of consecutive ops does not include a qualifying load op (conditional block 710, "no" leg), then regular processing is used for the pair of ops (block 720). After blocks 715 and 720, method 700 ends.

Figure 8:
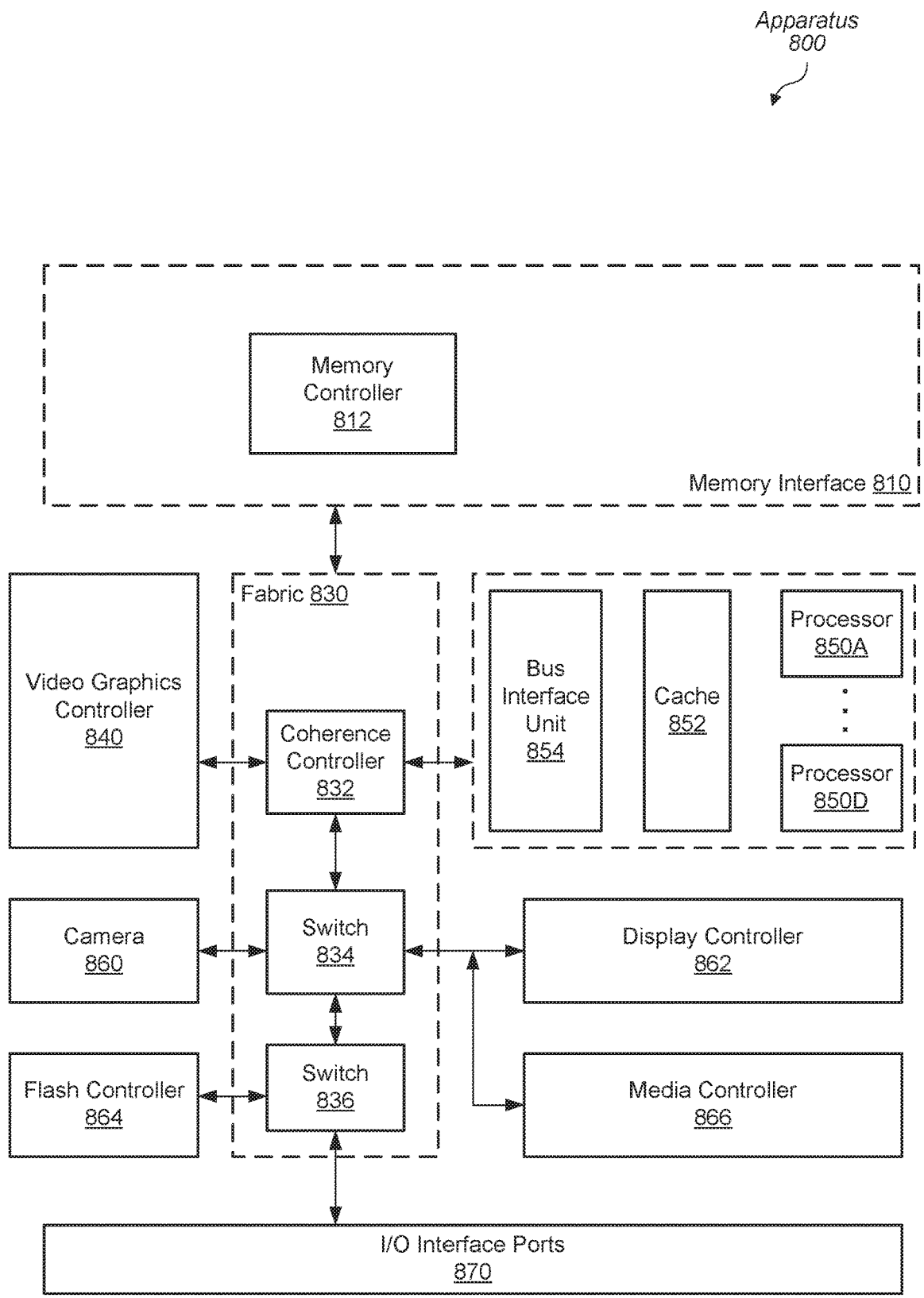
FIG. 8 is a block diagram of one embodiment of an apparatus.

Turning to FIG. 8, a generalized block diagram illustrating one embodiment of an apparatus 800 is shown. The apparatus 800 includes multiple functional blocks or units. In some embodiments, the multiple functional units are individual dies on an integrated circuit (IC), such as a system-on-a-chip (SoC). In other embodiments, the multiple functional units are individual dies within a package, such as a multi-chip module (MCM). In yet other embodiments, the multiple functional units are individual dies or chips on a printed circuit board. The multiple functional blocks or units may each be capable of accessing a shared memory.

In various embodiments, the apparatus 800 is a SOC that includes multiple types of IC designs on a single semiconductor die, wherein each IC design provides a separate functionality. The IC designs on the apparatus 800 may also be referred to as functional blocks on the apparatus 800. Traditionally, each one of the types of IC designs, or functional blocks, has been manufactured on a separate silicon wafer. In the illustrated embodiment, the apparatus 800 includes multiple IC designs; a fabric 830 for high-level interconnects and chip communication, a memory interface 810, and various input/output (I/O) interfaces 870. Clock sources, such as phase lock loops (PLLs), and a centralized control block for at least power management are not shown for ease of illustration.

The multiple IC designs within the apparatus 800 include various analog, digital, mixed-signal and radio-frequency (RF) blocks. In the illustrated embodiment, the apparatus 800 includes one or more processors 850A-850D with a supporting cache hierarchy that includes at least cache 852. In some embodiments, the cache 852 is a shared level two (L2) cache for the processors 850A-850D. In addition, the multiple IC designs include a display controller 862, a flash memory controller 864, and a media controller 866. Further, the multiple IC designs may include a video graphics controller 840 and one or more processing blocks associated with real-time memory performance for display and camera subsystems, such as camera 860. In other embodiments, the apparatus 800 uses other types of processing blocks in addition to or in place of the blocks shown.

In various embodiments, the fabric 830 provides a top-level interconnect for the apparatus 800. For example, connections to the cache coherence controller 832 exist for various requestors within the apparatus 800. A requestor is one of the multiple IC designs on the apparatus 800. The cache coherence controller 832 provides to the multiple IC designs a consistent data value for a given data block in the shared memory, such as off-chip dynamic random access memory (DRAM). The coherence controller 832 may use a cache coherency protocol for memory accesses to and from the memory interface 810 and one or more caches in the multiple IC designs on the apparatus 800.

The memory interface 810 uses the memory controller 812 which is not a coherency point within the apparatus 800 as it is separate from the coherence controller 832. The interface between the combination of the memory interface 810 and the coherency controller 832 and the remainder of the apparatus 800, which includes the multiple IC designs and the switches 834 and 836, includes multiple buses. Asynchronous memory requests, responses, snoops, snoop responses, and input/output (I/O) transactions are visible at this interface with temporal relationships.

The display controller 862 sends rendered graphics output information to one or more display devices. The rendering of the information is performed by the display controller 862, by the video graphics controller 840, or by one of the processors 850A-850D which is a GPU. Alternatively, the display controller 862 may send graphics output information to the video graphics controller 840 to be output to one or more display devices. The graphics output information corresponds to frame buffers accessed via a memory mapping to the memory space of a GPU within the video graphics controller 840 or within one of the processors 850A-850D.

Each one of the processors 850A-850D uses one or more cores and one or more levels of a cache memory subsystem. Each core supports the out-of-order execution of one or more threads of a software process and include a multi-stage pipeline. One or more of the processors 850A-850D uses circuitry for executing instructions according to a predefined general-purpose instruction set. For example, the PowerPC® instruction set architecture (ISA) may be selected. Alternatively, the ARM®, x86®, x86-64®, Alpha®, MIPS®, PA-RISC®, SPARC® or any other instruction set architecture is selected.

Other processor cores of processors 850A-850D have a micro-architecture which provides high instruction throughput for a computational intensive task such as a single instruction multiple data (SIMD) core. Examples of SIMD cores include graphics processing units (GPUs) and digital signal processing (DSP) cores. One or more of the processors 850A-850D uses multiple on-die levels (L1, L2, L3 and so forth) of caches for accessing data and instructions. If a requested block is not found in the on-die caches or in the off-die cache 852, then a read request for the missing block is generated and transmitted to the memory interface 810 or to on-die flash memory (not shown) controlled by the flash controller 864. The bus interface unit (BIU) 854 provides memory access requests and responses for at least the processors 850A-850D.

The processors 850A-850D share the on-chip flash memory and the off-chip DRAM accessed through the memory interface 810 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherency transactions between processing blocks and peripherals. In a SOC design that includes multiple processors and processing blocks, these components communicate with each other to control access to shared resources.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory; and
a processor coupled to the memory;
wherein the processor is configured to:
 detect a store operation followed by a load operation together in a same decode group, wherein a decode group comprises one or more operations:
  received by a decode unit from a fetch unit; and
  decoded by the decode unit in a single cycle; and
 determine the load operation qualifies to be converted to a zero cycle load bypass operation based on consideration of only a single decode group, wherein the single decode group is the same decode group and said consideration comprises a comparison of operations within the same decode group to operations within the same decode group; and
 a determination, based on the comparison, that there is no intervening operation in the same decode group between the store operation and the load operation that writes to an architectural register used to reference a memory location accessed by the store operation and the load operation; and
 rename a destination operand of the load operation with a same physical register identifier as a source operand of the store operation responsive to determining that the load operation qualifies to be converted to a zero cycle load bypass operation.

2. The system as recited in claim 1, wherein the processor is further configured to determine, based on the comparison, that there is no intervening operation in the same decode group based at least in part on a determination that the store operation and the load operation are consecutive operations.

3. The system as recited in claim 1, wherein the processor is configured to compare opcodes of each pair of operations generated in a same cycle by the decode unit.

4. The system as recited in claim 3, wherein the opcodes are compared to determine if a load operation follows a store operation with an address dependency.

5. The system as recited in claim 1, wherein the processor is configured to prevent a read from a free list responsive to determining that the load operation qualifies to be converted to a zero cycle load bypass operation.

6. The system as recited in claim 1, wherein in response to determining that the load operation qualifies to be converted to a zero cycle load bypass operation, the processor is further configured to:
bypass data from the store operation to the load operation; and
prevent a read from memory based on the load operation.

7. The system as recited in claim 1, wherein the processor is further configured to determine the load operation qualifies to be converted to the zero cycle load bypass operation based on a determination that a data producer of the same decode group that produces data stored by the store operation is not a zero cycle load operation.

8. A processor comprising:
a mapper for mapping architectural registers to physical registers;
a free list for storing identifiers (IDs) of physical registers that are currently unassigned and available for new mappings; and
a decode unit; and
control logic configured to:
detect a store operation followed by a load operation together in a same decode group, wherein a decode group comprises one or more operations:
received by a decode unit from a fetch unit; and
decoded by the decode unit in a single cycle; and
determine the load operation qualifies to be converted to a zero cycle load bypass operation based on consideration of only a single decode group, wherein the single decode group is the same decode group and said consideration comprises a comparison of operations within the same decode group to operations within the same decode group; and
a determination, based on the comparison, that there is no intervening operation in the same decode group between the store operation and the load operation that writes to an architectural register used to reference a memory location accessed by the store operation and the load operation; and
rename a destination operand of the load operation with a same physical register identifier as a source operand of the store operation responsive to determining that the load operation qualifies to be converted to a zero cycle load bypass operation.

9. The processor as recited in claim 8, wherein the control logic is further configured to determine, based on the comparison, that there is no intervening operation in the same decode group based at least in part on a determination that the store operation and the load operation are consecutive operations.

10. The processor as recited in claim 8, wherein the control logic is configured to compare opcodes of each pair of operations generated in a same cycle by the decode unit.

11. The processor as recited in claim 10, wherein the opcodes are compared to determine if a load operation follows a store operation with an address dependency.

12. The processor as recited in claim 8, further comprising a register rename unit configured to prevent a read from the free list responsive to determining that the load operation qualifies to be converted to a zero cycle load bypass operation.

13. The processor as recited in claim 8, wherein based at least in part on a determination that the load operation qualifies to be converted to a zero cycle load bypass operation, the control logic is configured to:
bypass data from the store operation to the load operation; and
prevent a read from memory based on the load operation.

14. The processor as recited in claim 8, wherein the control logic is configured to determine the load operation qualifies to be converted to the zero cycle load bypass operation based on a determination that a data producer of data stored by the store operation is not a zero cycle load operation.

15. A method comprising:
detecting, by a processor, a store operation followed by a load operation together in a same decode group, wherein a decode group comprises one or more operations:
received by a decode unit from a fetch unit; and
decoded by the decode unit in a single cycle; and
determining the load operation qualifies to be converted to a zero cycle load bypass operation, based on consideration of only a single decode group, wherein the single decode group is the same decode group and said considering comprises comparing operations within the same decode group to operations within the same decode group; and
a determination, based on a comparison, that there is no intervening operation in the decode group between the store operation and the load operation that writes to an architectural register used to reference a memory location accessed by the store operation and the load operation; and
renaming a destination operand of the load operation with a same physical register identifier as a source operand of the store operation responsive to determining that the load operation qualifies to be converted to a zero cycle load bypass operation.

16. The method as recited in claim 15, further comprising determining, based on the comparison, that there is no intervening operation in the same decode group based at least in part on a determination that the store operation and the load operation are consecutive operations.

17. The method as recited in claim 15, further comprising comparing opcodes of each pair of operations generated in a same cycle by a decode unit.

18. The method as recited in claim 17, wherein the opcodes are compared to determine if a load operation follows a store operation with an address dependency.

19. The method as recited in claim 15, further comprising, based at least in part on a determination that the load operation qualifies to be converted to a zero cycle load bypass operation:
preventing a read from a free list responsive to determining that the load operation qualifies to be converted to a zero cycle load bypass operation; and
bypassing data from the store operation to the load operation.

20. The method as recited in claim 15, further comprising determining the load operation qualifies to be converted to the zero cycle load bypass operation based on a determination that a data producer of the same decode group that produces data stored by the store operation is not a zero cycle load operation.

\* \* \* \* \*